United States Patent
Adachi et al.

(10) Patent No.: US 9,451,546 B2
(45) Date of Patent: Sep. 20, 2016

(54) MOBILE COMMUNICATION SYSTEM, BASE STATION, AND USER TERMINAL

(71) Applicant: KYOCERA CORPORATION, Kyoto (JP)

(72) Inventors: Hiroyuki Adachi, Kawasaki (JP); Kugo Morita, Yokohama (JP); Masato Fujishiro, Yokohama (JP); Chiharu Yamazaki, Ota-ku (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/874,127

(22) Filed: Oct. 2, 2015

(65) Prior Publication Data
US 2016/0029312 A1 Jan. 28, 2016

Related U.S. Application Data

(63) Continuation of application No. PCT/JP2014/059827, filed on Apr. 3, 2014.

(30) Foreign Application Priority Data

Apr. 5, 2013 (JP) .................................. 2013-080000

(51) Int. Cl.
*H04W 52/02* (2009.01)
*H04W 76/04* (2009.01)
*H04W 72/12* (2009.01)
*H04L 5/14* (2006.01)
*H04W 72/04* (2009.01)
*H04L 5/00* (2006.01)

(52) U.S. Cl.
CPC ........ *H04W 52/0216* (2013.01); *H04L 5/0053* (2013.01); *H04W 72/1289* (2013.01); *H04W 76/048* (2013.01); *H04L 5/0032* (2013.01); *H04L 5/14* (2013.01); *H04W 72/042* (2013.01); *H04W 72/0406* (2013.01); *Y02B 60/50* (2013.01)

(58) Field of Classification Search
CPC ......... H04W 52/0216; H04W 72/042; H04W 72/0406; H04W 76/048; H04L 5/0032; H04L 5/0053; H04L 5/14; H04B 15/00
See application file for complete search history.

(56) References Cited

U.S. PATENT DOCUMENTS

| 8,725,183 B2 | 5/2014 | Kim et al. |
| 2012/0094654 A1 | 4/2012 | Kim et al. |
| 2013/0252616 A1 | 9/2013 | Murakami |

(Continued)

FOREIGN PATENT DOCUMENTS

| JP | 2012-531080 A | 12/2012 |
| WO | 2012/066676 A1 | 5/2012 |
| WO | 2013/135295 A1 | 9/2013 |

OTHER PUBLICATIONS

Ericsson, Extended cell DTX for enhanced energy-efficient network operation, 3GPP TSG-RAN WG1 #59, Jeju, Korea, Nov. 9-13, 2009, R1-095011.*

(Continued)

*Primary Examiner* — Chi H Pham
*Assistant Examiner* — Shailendra Kumar
(74) *Attorney, Agent, or Firm* — Studebaker & Brackett PC

(57) ABSTRACT

A base station for managing a cell includes a controller configured to perform an on/off operation to turn a downlink transmission of the cell on and off. The controller performs a process of transmitting a periodic radio signal including a cell-specific reference signal.

7 Claims, 10 Drawing Sheets

(56) References Cited

U.S. PATENT DOCUMENTS

| | | | |
|---|---|---|---|
| 2014/0177562 A1* | 6/2014 | Li | H04L 5/001 370/329 |
| 2014/0204868 A1* | 7/2014 | Lin | H04W 72/0406 370/329 |
| 2015/0023331 A1* | 1/2015 | You | H04L 5/0048 370/336 |
| 2015/0305024 A1* | 10/2015 | Rosa | H04W 56/00 370/329 |
| 2015/0305084 A1* | 10/2015 | Ji | H04W 76/048 370/311 |

OTHER PUBLICATIONS

3GPP TSG RAN WG1 Meeting #66bis, R1-113289, Zhuhai, China, Oct. 10-14, 2011, NTT DoCoMo, On the need for additional carrier types in Rel-11 CA.

International Search Report issued in PCT/JP2014/059827 mailed Jun. 24, 2014.

Written Opinion issued in PCT/JP2014/059827 mailed Jun. 24, 2014.

An Office Action; "Notice of Reasons for Rejection," issued by the Japanese Patent Office on Feb. 16, 2016, which corresponds to Japanese Patent Application No. 2015-256398 and is related to U.S. Appl. No. 14/874,127; with English language statement of relevance.

An Office Action; "Notice of Reasons for Rejection," issued by the Japanese Patent Office on Nov. 4, 2015, which corresponds to Japanese Patent Application No. 2013-080000 and is related to U.S. Appl. No. 14/874,127; with English language Statement of Relevance.

Huawei; "Energy savings techniques for LTE"; 3GPP; TSG WG2 #69, R2-101824; Feb. 22-26, 2010; pp. 1-10; San Francisco, USA.

ZTE; "Analysis of network energy saving solutions"; 3GPP; TSG RAN WG1 Meeting #60, R1-100970; Feb. 22-26, 2010; pp. 1-9; San Francisco, USA.

\* cited by examiner

MOBILE COMMUNICATION SYSTEM, BASE STATION, AND USER TERMINAL

TECHNICAL FIELD

The present disclosure relates to a mobile communication system in which a new carrier type is introduced.

BACKGROUND ART

In a 3rd Generation Partnership Project (3GPP) that is a standardization project of a mobile communication system, an introduction of a new carrier type (NCT) on and after the release 12 is under review.

As one of NCTs, it is proposed to reduce a cell-specific reference signal (CRS) compared to a legacy carrier type (LCT) (for example, see Non-Patent Literature 1). This makes it possible to use radio resources used for transmission of the CRS for transmission of user data (a data signal) or the like, and thus the throughput can be improved.

CITATION LIST

Non Patent Literature

Non Patent Literature 1: 3GPP contribution "R1-113289"

SUMMARY

However, the CRS reduction technique related to the NCT can improve the throughput, but there is room for improvement in terms of reduction of power consumption (that is, power saving).

In this regard, the present disclosure provides a mobile communication system, a base station, and a user terminal, which are capable of implementing efficient power saving.

A mobile communication system according to a first aspect comprises a base station configured to manage a cell. The base station comprises: a transmitter configured to transmit a radio signal to a user terminal within the cell; and a base station side controller configured to set a transmission stop interval in which an operation of the transmitter is stopped. The transmitter intermittently transmits a cell-specific reference signal that is a sort of the radio signal. The base station side controller sets the transmission stop interval to a period of time in which the transmitter does not transmit the cell-specific reference signal.

A base station according to a second aspect manages a cell. The base station comprises: a transmitter configured to transmit a radio signal to a user terminal within the cell; and a base station side controller configured to set a transmission stop interval in which an operation of the transmitter is stopped. The transmitter intermittently transmits a cell-specific reference signal that is a sort of the radio signal. The base station side controller sets the transmission stop interval to a period of time in which the transmitter does not transmit the cell-specific reference signal.

A user terminal according to a third aspect performs intermittent reception in which a radio signal is intermittently received from a base station. The user terminal comprises: a receiver configured to switch from a stop state to an operation state at an activation timing according to a predetermined period of time; and a terminal side controller configured to adjust the activation timing so that a transmission stop interval in which transmission of the radio signal is stopped is avoided when a notification of the transmission stop interval is given from the base station.

A user terminal according to a fourth aspect performs intermittent reception in which a radio signal is intermittently received from a base station. The user terminal comprises: a receiver configured to switch from a stop state to an operation state at an activation timing according to a predetermined period of time; and a terminal side controller configured to adjust the activation timing so that the receiver receives the control signal at a transmission timing of the control signal when a notification of the transmission timing of the control signal by an enhanced physical downlink control channel (ePDCCH) is given from the base station.

DESCRIPTION OF EMBODIMENTS

[Overview of Embodiments]

Figure 1:
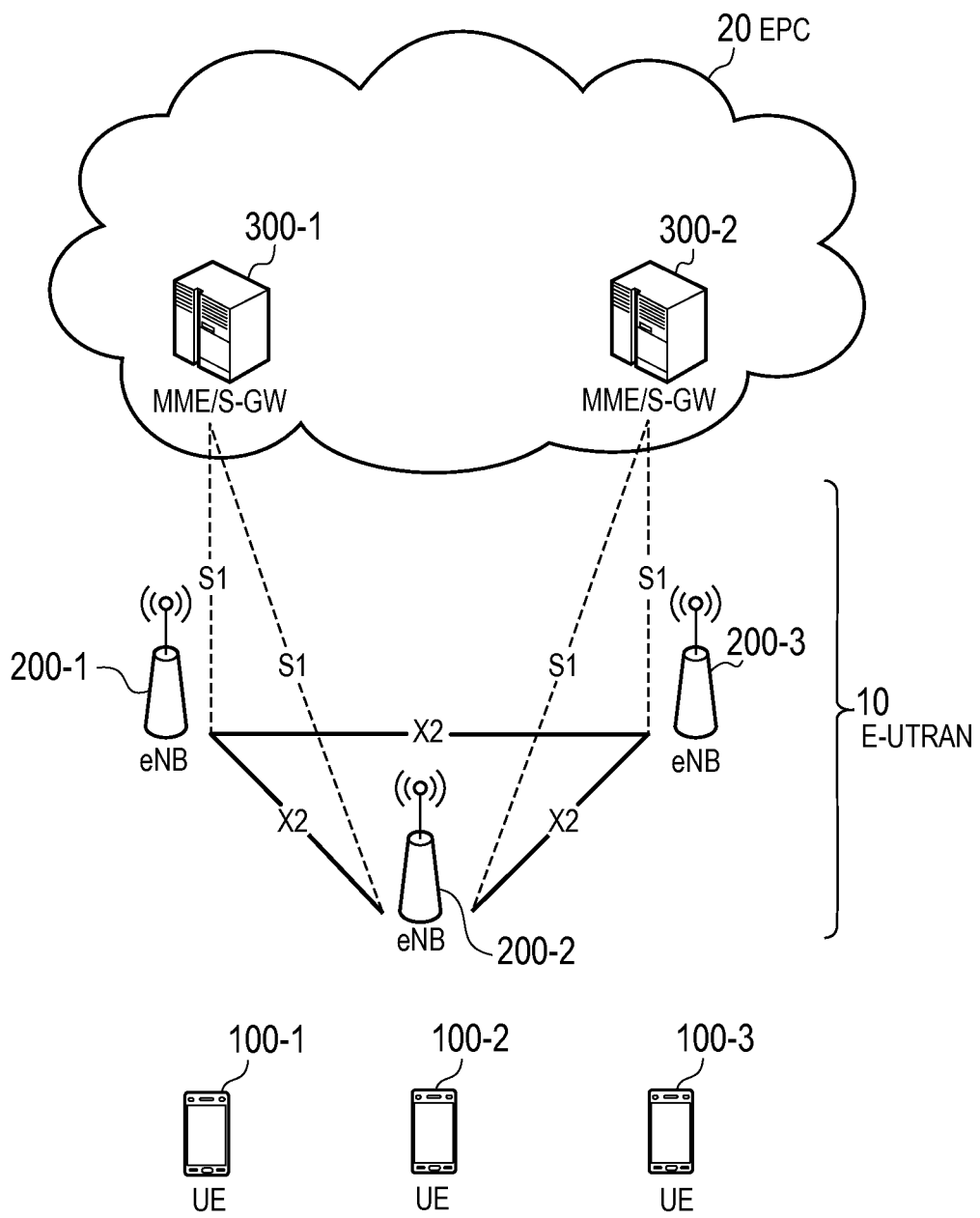
FIG. 1 is a configuration diagram of an LTE system according to first to third embodiments.

A mobile communication system according to first to third embodiments comprises a base station configured to manage a cell. The base station comprises: a transmitter configured to transmit a radio signal to a user terminal within the cell; and a base station side controller configured to set a transmission stop interval in which an operation of the transmitter is stopped. The transmitter intermittently transmits a cell-specific reference signal that is a sort of the radio signal. The base station side controller sets the transmission stop interval to a period of time in which the transmitter does not transmit the cell-specific reference signal.

In the first to third embodiments, the transmission stop interval is dynamically changeable. The transmitter transmits a control signal that is a sort of the radio signal to the user terminal through an enhanced physical downlink control channel (ePDCCH) allocated to the individual user terminal. The base station side controller controls an allocation of the ePDCCH so that the transmission stop interval is extended.

In the first to third embodiments, the transmission stop interval is dynamically changeable. The transmitter transmits a data signal that is a sort of the radio signal to the user terminal through a physical downlink shared channel (PDSCH) allocated to the individual user terminal. The base station side controller controls an allocation of the PDSCH so that the transmission stop interval is extended.

Alternatively, in the first to third embodiments, the transmission stop interval is fixedly set in advance. The transmitter transmits a control signal that is a sort of the radio signal to the user terminal through an enhanced physical downlink control channel (ePDCCH) allocated to the individual user terminal. The base station side controller controls an allocation of the ePDCCH so that the transmission stop interval is avoided.

In the first to third embodiments, the transmission stop interval is fixedly set in advance. The transmitter transmits a data signal that is a sort of the radio signal to the user terminal through a physical downlink shared channel (PDSCH) allocated to the individual user terminal. The base station side controller controls an allocation of the PDSCH so that the transmission stop interval is avoided.

In the first to third embodiments, the base station side controller notifies the user terminal of the transmission stop interval in a broadcast or unicast manner.

In the first to third embodiments, the base station side controller notifies a neighboring base station of the transmission stop interval.

In the second embodiment, the user terminal comprises: a receiver configured to receive the radio signal; and a terminal side controller configured to control intermittent reception in which the radio signal is intermittently received based on the transmission stop interval notified from the base station. The receiver switches from a stop state to an operation state at an activation timing according to a predetermined period of time. The terminal side controller adjusts the activation timing so that the transmission stop interval is avoided.

In the third embodiment, the user terminal comprises: a receiver configured to receive the radio signal; and a terminal side controller configured to control intermittent reception in which the radio signal is intermittently received. The receiver switches from a stop state to an operation state at an activation timing according to a predetermined period of time. The terminal side controller adjusts the activation timing so that the receiver receives the control signal at a transmission timing of the control signal when a notification of the transmission timing of the control signal by an enhanced physical downlink control channel (ePDCCH) is given from the base station.

A base station according to the first to third embodiments manages a cell. The base station comprises: a transmitter configured to transmit a radio signal to a user terminal within the cell; and a base station side controller configured to set a transmission stop interval in which an operation of the transmitter is stopped. The transmitter intermittently transmits a cell-specific reference signal that is a sort of the radio signal. The base station side controller sets the transmission stop interval to a period of time in which the transmitter does not transmit the cell-specific reference signal.

A user terminal according to the second embodiment performs intermittent reception in which a radio signal is intermittently received from a base station. The user terminal comprises: a receiver configured to switch from a stop state to an operation state at an activation timing according to a predetermined period of time; and a terminal side controller configured to adjust the activation timing so that a transmission stop interval in which transmission of the radio signal is stopped is avoided when a notification of the transmission stop interval is given from the base station.

A user terminal according to the third embodiment performs intermittent reception in which a radio signal is intermittently received from a base station. The user terminal comprises: a receiver configured to switch from a stop state to an operation state at an activation timing according to a predetermined period of time; and a terminal side controller configured to adjust the activation timing so that the receiver receives the control signal at a transmission timing of the control signal when a notification of the transmission timing of the control signal by an enhanced physical downlink control channel (ePDCCH) is given from the base station.

[First Embodiment]

Hereinafter, an embodiment in which the present disclosure is applied to Long Term Evolution (LTE) that has been standardized by the 3GPP will be described with reference to the appended drawings.

(Configuration of LTE System)

FIG. 1 is a configuration diagram of an LTE system according to the first embodiment. As shown in FIG. 1, the LTE system includes a plurality of UEs (User Equipment) 100, an E-UTRAN (Evolved-UMTS Terrestrial Radio Access Network) 10, and an EPC (Evolved Packet Core) 20. The E-UTRAN 10 corresponds to a radio access network, and the EPC 20 corresponds to a core network. The E-UTRAN 10 and the EPC 20 constitute a network of the LTE system.

The UE 100 is a mobile type communication device, and performs a radio communication with a cell of connection destination (serving cell). The UE 100 corresponds to a user terminal.

The E-UTRAN 10 includes a plurality of eNBs 200 (evolved Node-B). The eNB 200 corresponds to a base station. The eNB 200 manages one or more cells, and performs a radio communication with the UE 100 having established a connection with the own cell. It should be noted that in addition to being used as a term representing the minimum unit of a radio communication area, "cell" is also used as a term representing a function of performing radio communication with the UE 100.

The eNB 200 includes, for example, a radio resource management (RRM) function, a routing function of the user data, and a measurement control function for mobility control and scheduling.

The EPC 20 includes a plurality of MME (Mobility Management Entity)/S-GWs (Serving-Gateway) 300. The MME is a network node configured to perform various mobility controls and the like on the UE 100, and corresponds to a control station. The S-GW is a network node configured to perform transfer control of the user data, and corresponds to a switching center.

The eNBs 200 are connected to each other through the X2 interface. In addition, the eNBs 200 are connected to the MME/S-GWs 300 through the S1 interface.

Next, the configuration of the UE 100 and the eNB 200 will be described.

Figure 2:
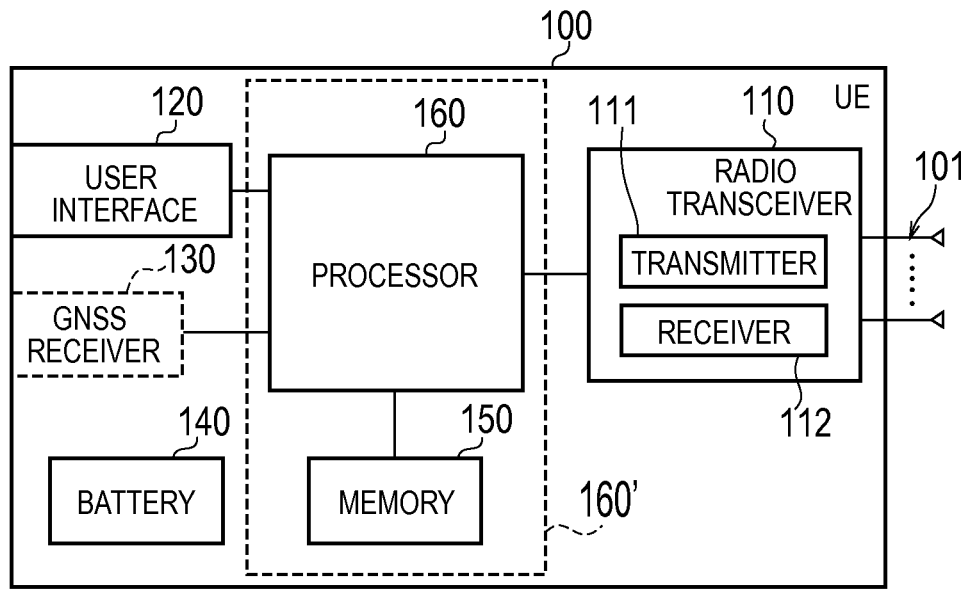
FIG. 2 is a block diagram of a UE according to the first to third embodiments.

FIG. 2 is a block diagram of the UE 100. As shown in FIG. 2, the UE 100 includes a plurality of antennas 101, a radio transceiver 110, a user interface 120, a GNSS (Global Navigation Satellite System) receiver 130, a battery 140, a memory 150, and a processor 160. The memory 150 and the processor 160 constitute a terminal side controller. The UE 100 does not have to include the GNSS receiver 130. In addition, the memory 150 may be integrated with the processor 160, and this set (that is, chipset) may be referred to as a processor 160'.

The plurality of antennas 101 and the radio transceiver 110 are used for the transmission and reception of radio signals. The radio transceiver 110 includes a transmitter 111 configured to convert the baseband signal (transmission signal) output by the processor 160 into a radio signal to transmit from the plurality of antennas 101. In addition, the radio transceiver 110 includes a receiver 112 configured to convert the radio signal received by the plurality of antennas 101 into a baseband signal (received signal) to output to the processor 160.

The user interface 120 is an interface with a user who owns the UE 100, and includes, for example, a display, a microphone, a speaker, and various buttons. The user interface 120 receives operation from the user, and outputs signals indicating the contents of the operation to the processor 160. The GNSS receiver 130 receives the GNSS signal so as to obtain the positional information indicating the geographic location of the UE 100, to output the received signal to the processor 160. The battery 140 stores electric power to be supplied to each block of the UE 100.

The memory 150 stores the program executed by the processor 160, and the information used for the processing by the processor 160.

The processor 160 performs modulation, demodulation, coding, and decoding of a baseband signal. The processor 160 executes the program stored in the memory 150 to perform various kinds of processing. The processor 160 performs various kinds of processing and various communication protocols described below. The processor 160 may further include a codec configured to perform encoding and decoding of audio and video signals.

Figure 3:
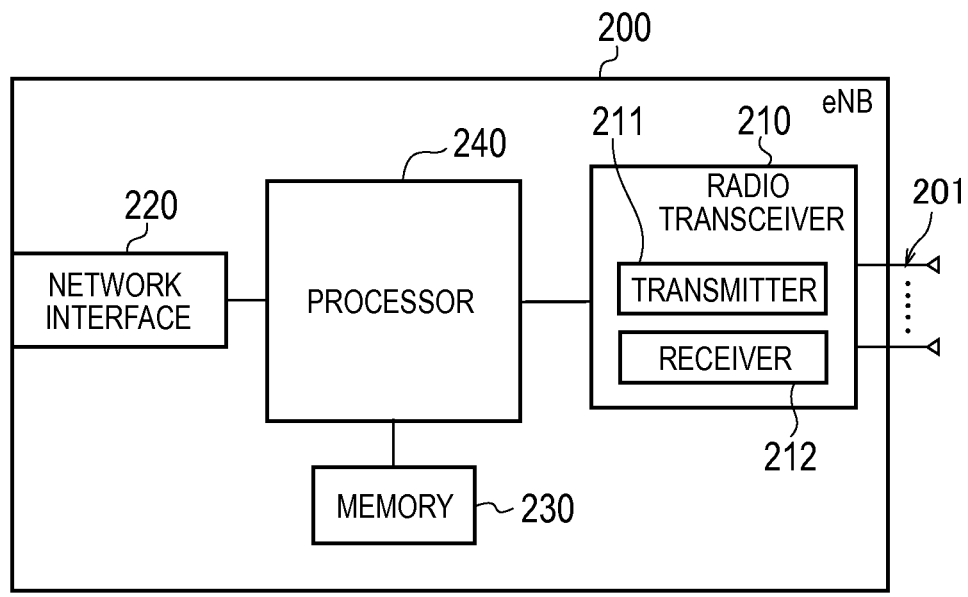
FIG. 3 is a block diagram of an eNB according to the first to third embodiments.

FIG. 3 is a block diagram of the eNB 200. As shown in FIG. 3, the eNB 200 includes a plurality of antennas 201, a radio transceiver 210, a network interface 220, a memory 230, and a processor 240. The memory 230 and the processor 240 constitute a base station side controller.

The plurality of antennas 201 and the radio transceiver 210 are used for the transmission and reception of radio signals. The radio transceiver 210 includes a transmitter 211 configured to convert the baseband signal (transmission signal) output by the processor 240 into a radio signal to transmit from the plurality of antennas 201. In addition, the radio transceiver 210 includes a receiver 212 configured to convert the radio signal received by the plurality of antennas 201 into a baseband signal (received signal) to output to the processor 240.

The network interface 220 is connected to an adjacent eNB 200 through the X2 interface, and connected to a MME/S-GW 300 through the S1 interface. The network interface 220 is used for the communication performed on the X2 interface and the communication performed on the S1 interface.

The memory 230 stores the program executed by the processor 240, and the information used for the processing by the processor 240.

The processor 240 performs modulation, demodulation, coding, and decoding of a baseband signal. The processor 240 executes the program stored in the memory 230 to perform various kinds of processing. The processor 240 performs various kinds of processing and various communication protocols described below.

Figure 4:
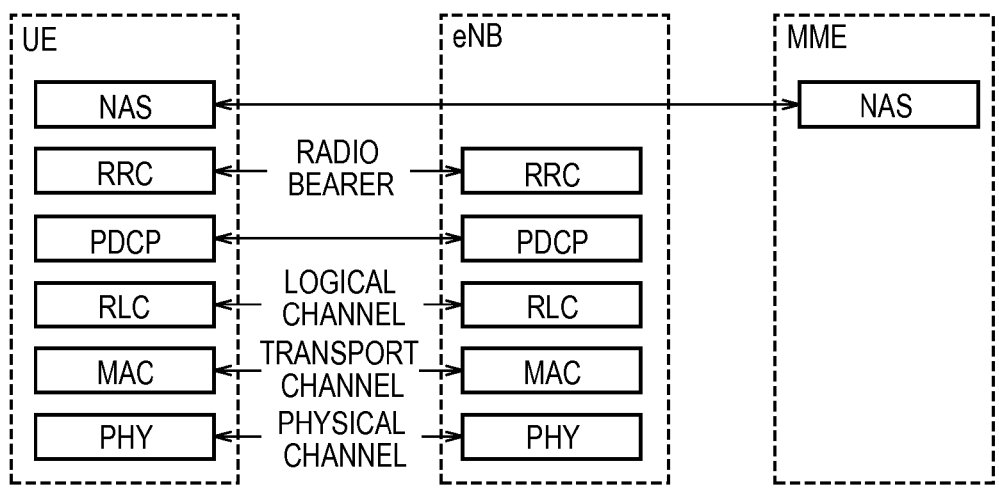
FIG. 4 is a protocol stack diagram of a radio interface in an LTE system.

FIG. 4 is a protocol stack diagram of a radio interface in the LTE system. As shown in FIG. 4, the radio interface protocol is divided into the layers 1 to 3 of the OSI reference model, and the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The physical layer performs encoding and decoding, modulation and demodulation, antenna mapping and demapping, and resource mapping and demapping. Between the physical layers of the UE 100 and the eNB 200, data are transmitted through the physical channel.

The MAC layer performs the priority control of data, the retransmission processing by hybrid ARQ (HARQ), and the like. Between the MAC layers of the UE 100 and the eNB 200, data are transmitted through the transport channel. The MAC layer of the eNB 200 includes a scheduler determining the transport format of the uplink and downlink (transport block size, modulation and coding scheme (MCS)) and the allocation resource block.

The RLC layer transmits the data to the RLC layer on the receiving side by utilizing the functions of the MAC layer and the physical layer. Between the RLC layers of the UE 100 and the eNB 200, data are transmitted through the logical channel.

The PDCP layer performs the header compression and decompression, and the encryption and decryption.

The RRC layer is defined only in the control plane. Between the RRC layers of the UE 100 and the eNB 200, a control message for various settings (RRC message) is transmitted. The RRC layer controls the logical channel, the transport channel, and the physical channel depending on the establishment, the re-establishment, and the release of the radio bearer. If there is a RRC connection between the RRCs of the UE 100 and the eNB 200, the UE 100 is in the connected state (RRC connected state), otherwise the UE 100 is in the idle state (RRC idle state).

The NAS (Non-Access Stratum) layer positioned in an upper level of the RRC layer performs the session management, the mobility management, and the like.

Figure 5:
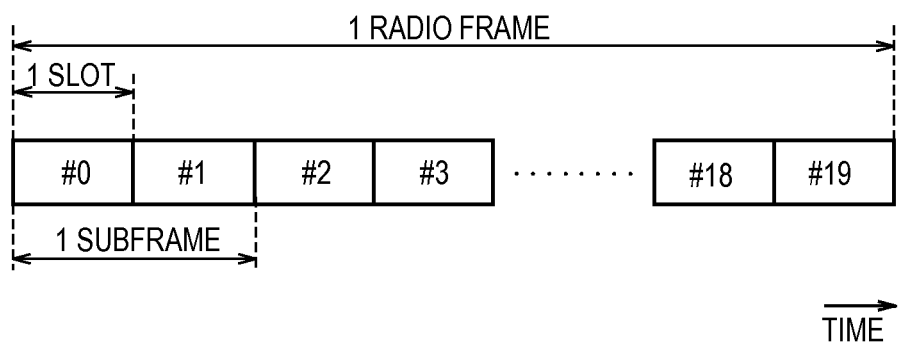
FIG. 5 is a configuration diagram of a radio frame used in an LTE system.

FIG. 5 is a configuration diagram of a radio frame used in the LTE system. In the LTE system, OFDMA (Orthogonal Frequency Division Multiplexing Access) is applied to the downlink, and SC-FDMA (Single Carrier Frequency Division Multiple Access) is applied to the uplink.

As shown in FIG. 5, the radio frame includes 10 subframes lined up in the time direction, and each subframe includes 2 slots lined up in the time direction. The length of each subframe is 1 ms, and the length of each slot is 0.5 ms. Each subframe includes a plurality of resource blocks (RB) in the frequency direction and a plurality of symbols in the time direction. The resource block includes a plurality of subcarriers in the frequency direction. A radio resource unit formed by one subcarrier and one symbol is referred to as a resource element (RE).

Among the radio resources allocated to the UE 100, the frequency resource can be specified by the resource block, and the time resource can be specified by the subframe (or slot).

(NCT)

The LTE system according to the first embodiment supports the NCT in the downlink. The NCT is scheduled to be introduced after the release 12, and a new carrier type that is free from the carrier type in the current releases (that is, the releases 8 to 11) is employed.

Figure 6:
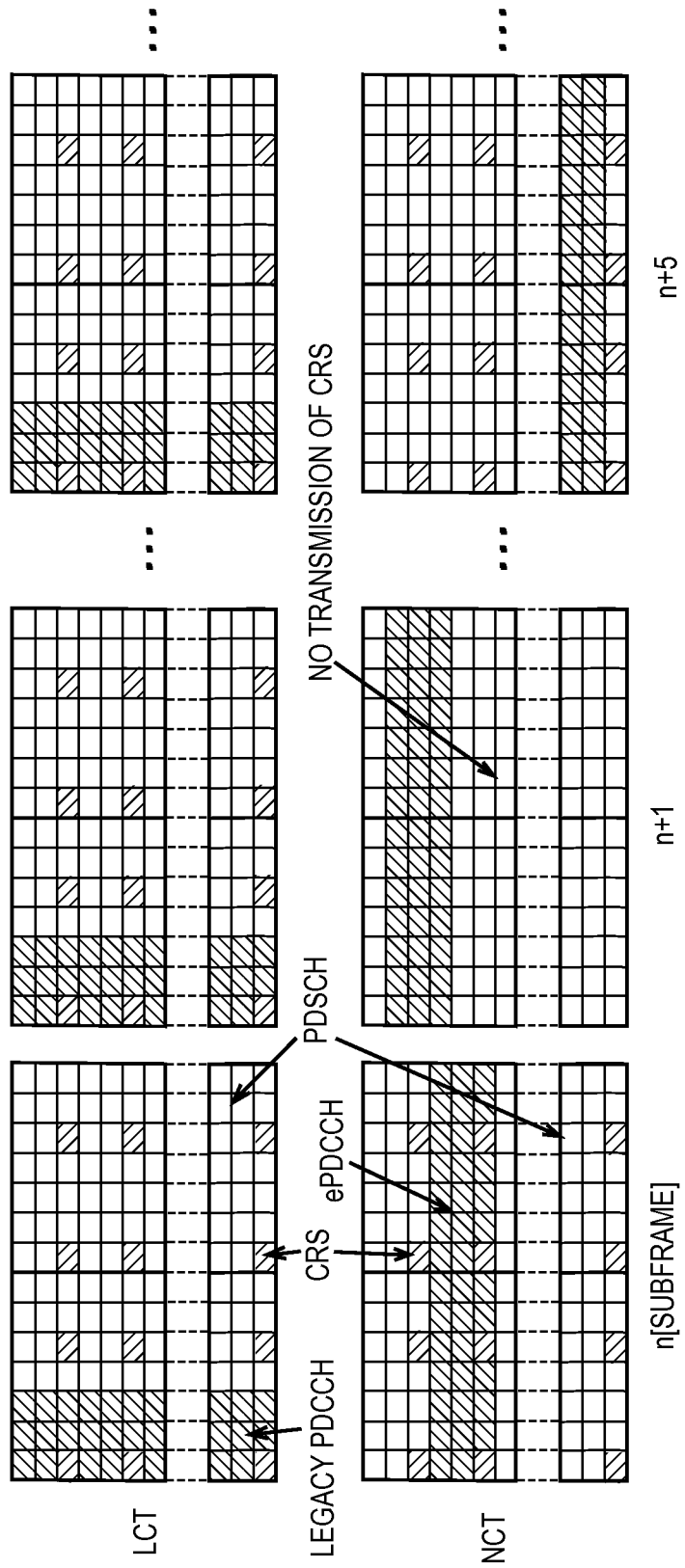
FIG. 6 is a diagram for illustrating an NCT according to the first to third embodiments when compared with an LCT.

FIG. 6 is a diagram for illustrating the NCT when compared with a legacy carrier type (LCT).

In the LCT, an interval of several symbols at the head of each subframe is a control region mainly used as a physical downlink control channel (PDCCH) for transmitting a control signal as illustrated in FIG. 6. The remaining interval of each subframe is a data region mainly used as a physical downlink shared channel (PDSCH) for transmitting user data (a data signal).

The PDCCH is used to transmit the control signal. The control signal includes, for example, uplink scheduling information (SI), downlink SI, and a TPC bit. The uplink SI is information indicating an allocation of uplink radio resources, and the downlink SI is information indicating an allocation of downlink radio resources. The TPC bit is information for instructing an increase or decrease in uplink transmission power. The information is referred to as downlink control information (DCI).

The PDSCH is used to transmit the control signal and/or the data signal. For example, the downlink data region may be allocated to only the data signal or may be allocated so that the data signal and the control signal are multiplexed.

The cell-specific reference signal (CRS) and the channel state information reference signal (CSI-RS) are distributedly disposed in each subframe. Each of the CRS and the CSI-RS is configured with a predetermined orthogonal signal sequence. In the LCT, the CRS is disposed in all subframes in the time axis direction. The CRS is a signal used for downlink channel state measurement, reception power (reference signal received power (RSRP) measurement, and the like in the UE 100.

On the other hand, in the NCT, an enhanced physical downlink control channel (ePDCCH) is disposed as a physical channel for transmitting the control signal instead of the PDCCH. The ePDCCH is a physical channel for transmitting the control signal in the data region (the PDSCH region). The ePDCCH can be allocated to the individual UE 100 and transmit the control signal to the individual UE 100. In the NCT, the CRS is disposed in only some subframes in the time axis direction.

Here, in the carrier aggregation, the LCT may be applied to a primary component carrier (PCC), and the NCT may be applied to only a secondary component carrier (SCC).

(Operation According to First Embodiment)

(1) Operation Overview

Figure 7:
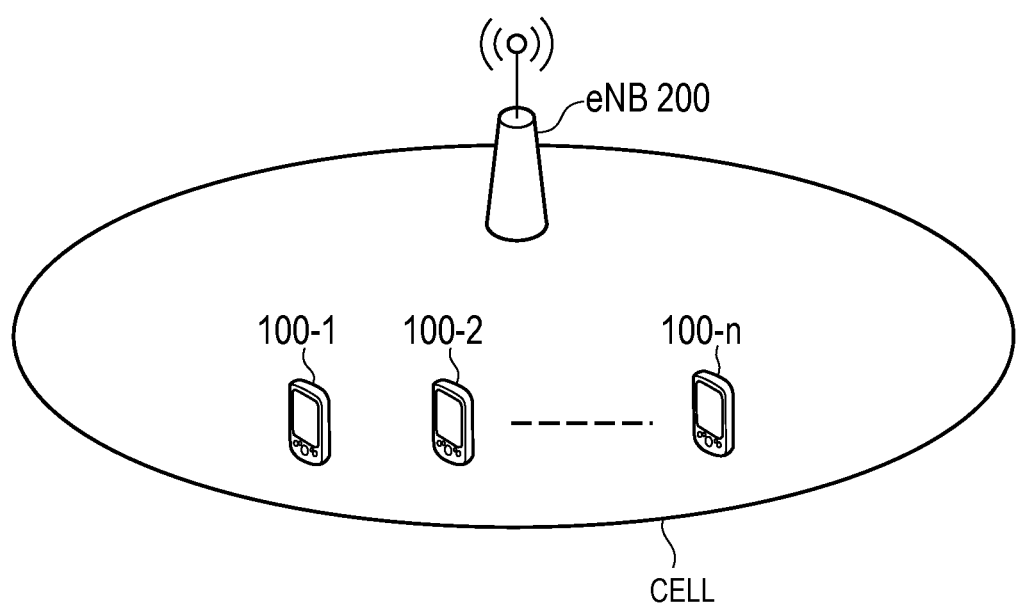
FIG. 7 is a diagram illustrating an operation environment according to the first to third embodiments.

First, an overview of an operation according to the first embodiment will be described. FIG. 7 is a diagram illustrating an operation environment according to the first embodiment. A plurality of UEs 100 (UEs 100-1 to 100-n) are positioned in a cell managed by an eNB 200 as illustrated in FIG. 7. The NCT in which the CRS is reduced is introduced in the cell managed by the eNB 200.

The eNB 200 includes a transmitter 211 (see FIG. 3) that transmits a radio signal to the UE 100 in the cell. The radio signal transmitted by the transmitter 211 includes the control signal, the data signal, the reference signal (the CRS and the CSI-RS), and the like. The transmitter 211 includes a power amplifier and is a portion that is high in power consumption in the eNB 200.

The eNB 200 includes a processor 240 (see FIG. 3) that sets a discontinuous transmission (DTX) interval in which the operation of the transmitter 211 is stopped. For example, the processor 240 stops the operation of the transmitter 211 by stopping supply of power to the transmitter 211 (the power amplifier). As the operation of the transmitter 211 is stopped, the power consumption reduction (power saving) of the eNB 200 is implemented.

In the DTX interval, the processor 240 stops the operation of the transmitter 211 but does not stop the operation of the receiver 212. Thus, even in the DTX interval, the radio signal can be continuously received from the UE 100.

The transmitter 211 intermittently transmits the CRS. As described above, the transmitter 211 transmits the CRS in only some subframes rather than the CRS in all subframes.

The processor 240 sets the DTX interval to a period of time (subframe) in which the transmitter 211 does not transmit the CRS. In other words, the operation of the transmitter 211 is stopped in the subframe in which the transmitter 211 does not transmit the CRS.

Since the DTX interval is set to a period of time in which the transmitter 211 does not transmit the CRS as described above, it is possible to implement the power saving of the eNB 200 while making it possible to perform channel state measurement, RSRP measurement, and the like.

(2) First Setting Method of Setting DTX Interval

Figure 8:
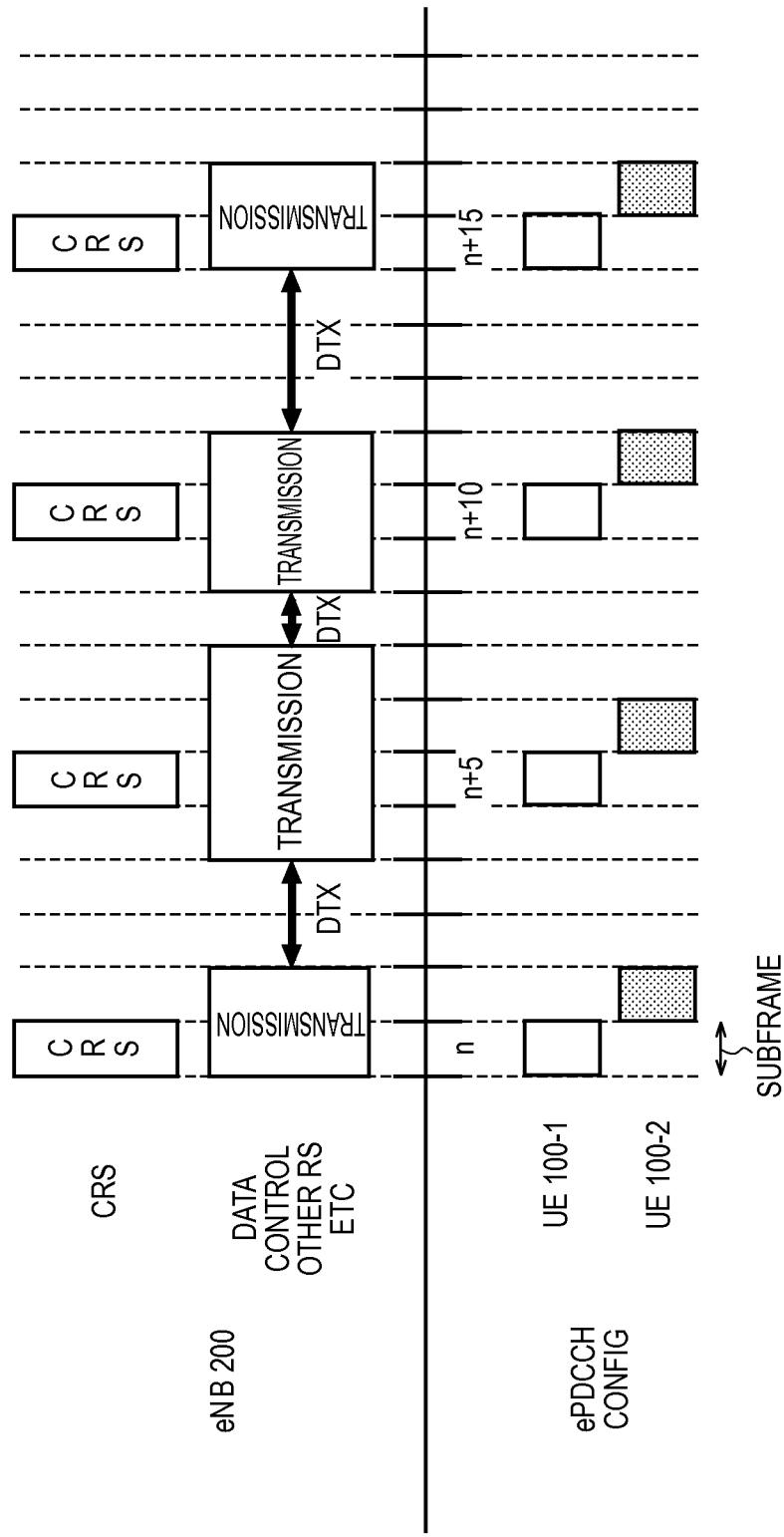
FIG. 8 is a diagram for illustrating a first setting method of setting a DTX interval according to the first embodiment.

FIG. 8 is a diagram for illustrating a first setting method of setting the DTX interval. In the first setting method, the DTX interval can be dynamically changed.

The eNB 200 transmits the CRS such that one CRS is allocated per 5 sub frames as illustrated in FIG. 8. Specifically, the CRS is transmitted in an n-th subframe, an (n+5)-th subframe, an (n+10)-th subframe, and an (n+15)-th subframe.

The eNB 200 sets the DTX interval to the period of time in which the transmitter 211 does not transmit the CRS. In the example of FIG. 8, (n+2)-th to (n+3)-th subframes, an (n+8)-th subframe, and (n+12)-th to (n+14)-th subframes are set as the DTX interval.

In the first setting method, the eNB 200 controls the allocation of the ePDCCH such that the DTX interval is extended. Since the ePDCCH can be allocated to the individual UE 100, for example, the DTX interval can be extended by adjusting so that transmission through the ePDCCH is temporally concentrated for a plurality of UEs 100 (the UEs 100-1 to 100-n). In the example of FIG. 8, the ePDCCH is allocated to the UE 100-1 in a subframe in which the CRS is transmitted. The ePDCCH is allocated to the UE 100-1 in a subframe next to the subframe in which the CRS is transmitted.

The eNB 200 sets an ePDCCH allocation subframe (and allocation resource block) to each the UE 100. Then, the eNB 200 transmits the control signal in the ePDCCH allocation subframe (and allocation resource block). Thus, the eNB 200 can extend the DTX interval by adjusting a setting of an allocation subframe or adjusting whether or not the control signal is transmitted.

Further, in the first setting method, the eNB 200 controls the allocation of the PDSCH such that the DTX interval is extended. Since the PDSCH can be allocated to the individual UE 100, it is possible to extend the DTX interval, for example, by adjusting so that transmission through the PDSCH is temporally concentrated on a plurality of UEs 100 (the UEs 100-1 to 100-n).

The eNB 200 may determine an adjustment degree in view of a traffic state or a data type (a QoS or the like) for each of a plurality of UEs 100.

Further, in the first setting method, the eNB 200 may extend the DTX interval by adjusting transmission of an ACK/NACK for data received from the UE 100. For example, the eNB 200 transmits the ACK/NACK from the PCC when the NCT is the SCC. Further, when a timing at which a specified period of time (8 subframes) of ACK/NACK transmission has elapsed after data is received from the UE 100 overlaps the DTX interval, the eNB 200 transmits the ACK/NACK after the specified period of time elapses (after the DTX interval elapses).

(3) Second Setting Method of Setting DTX Interval

In the first setting method, it is possible to dynamically change the DTX interval, but in a second setting method, the DTX interval is fixedly set in advance.

In the first setting method, it is possible to further reduce the power consumption of the eNB 200 by extending the DTX interval, but a scheduling load of the eNB 200 is large.

In the second setting method, since the DTX interval is fixedly set in advance, the scheduling load of the eNB 200 is larger than in the first setting method.

In the second setting method, the eNB 200 controls the allocation of the ePDCCH such that the DTX interval that is fixedly set in advance is avoided. Further, the eNB 200 controls the allocation of the PDSCH such that the DTX interval that is fixedly set in advance is avoided. The other control is the same as in the first setting method.

(4) Notification of DTX Interval to UE

It is necessary to share the information of the DTX interval with the UE 100 so that the UE 100 appropriately performs the channel state measurement or the like. Further, when the UE 100 performs a discontinuous reception (DRX) operation, the UE 100 can efficiently perform the DRX operation in view of the DTX interval (the details will be described in the second embodiment).

In this regard, in the first embodiment, the eNB 200 notifies the UE 100 of the DTX interval in the broadcast or unicast manner.

As a notice method using broadcasting, the eNB 200 includes information indicating the DTX interval in a master information block (MIB) or a system information block (SIB), and transmits the resulting MIB or the resulting SIB to the UE 100.

Figure 9:
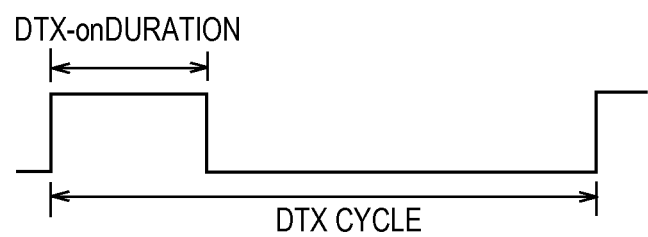
FIG. 9 is a diagram for illustrating a notice method of a DTX interval according to the first embodiment.

Here, in the first setting method, the information indicating the DTX interval is, for example, a subframe number corresponding to the DTX interval. On the other hand, in the second setting method, the information indicating the DTX interval may be the subframe number corresponding to the DTX interval or may be pattern information of the DTX interval. For example, when the eNB 200 activates the transmitter 211 with a predetermined activation cycle (dtxCycle), and continues the operation state during a predetermined activation period of time (dtx-onDuration), information indicating the activation cycle and the activation period of time can be used as the information indicating the DTX interval as illustrated in FIG. 9.

As a notice method using unicasting, the eNB 200 includes the information indicating the DTX interval in the RRC message, and transmits the resulting RRC message to the UE 100. Alternatively, as a notice method using unicasting the eNB 200 includes a DTX flag in a notification message of an MBMS single frequency network (MBSFN) subframe, and transmits the resulting notification message to the UE 100. In this case, when the DTX flag is set to ON, the MBSFN subframe is interpreted as the DTX interval.

(5) Notification of DTX Interval to Neighboring eNB.

It is necessary to share the information of the DTX interval with the neighboring eNB 200 so that the neighboring eNB 200 appropriately performs mobility control of the UE 100 managed by the neighboring eNB 200.

In the first embodiment, the eNB 200 notifies the neighboring eNB 200 of the DTX interval. For example, the eNB 200 includes the information indicating the DTX interval in an X2 message, and transmits the X2 message to the neighboring eNB 200.

Alternatively, an almost blank subframe (ABS)-associated X2 message is used, and a subframe corresponding to the DTX interval is notified as the ABS. Further, the DTX flag may be added to the ABS-associated X2 message to indicate that the ABS is a subframe of complete non-transmission.

[Second Embodiment]

A second embodiment will be described focusing on a difference point with the first embodiment. The second embodiment is an embodiment related to the DRX operation of the UE 100.

Figure 10:
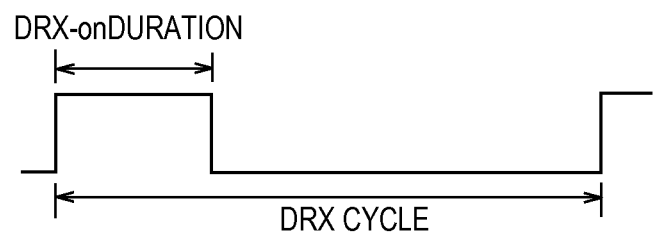
FIG. 10 is a diagram for illustrating a DRX operation.

The UE 100 performs the DRX operation (intermittent reception) in a connected state for battery saving. FIG. 10 is a diagram for illustrating the DRX operation.

The processor 160 (see FIG. 2) of the UE 100 controls the DRX operation of intermittently receiving the radio signal as illustrated in FIG. 10. Specifically, the receiver 112 is activated with a predetermined activation cycle (drxCycle), and the operation state is continued during a predetermined activation period of time (drx-onDuration) to monitor the control signal. The activation cycle (drxCycle) is referred to as a "DRX cycle," and two types of DRX cycles, that is, a long DRX cycle and a short DRX cycle are specified. As described above, the receiver 112 performs switching from the stop state to the operation state at an activation timing according to the DRX cycle (a predetermined cycle).

In the second embodiment, the processor 160 controls the DRX operation based on the DTX interval notified from the eNB 200. Specifically, the processor 160 adjusts the activation timing in order to avoid the DTX interval.

Figure 11:
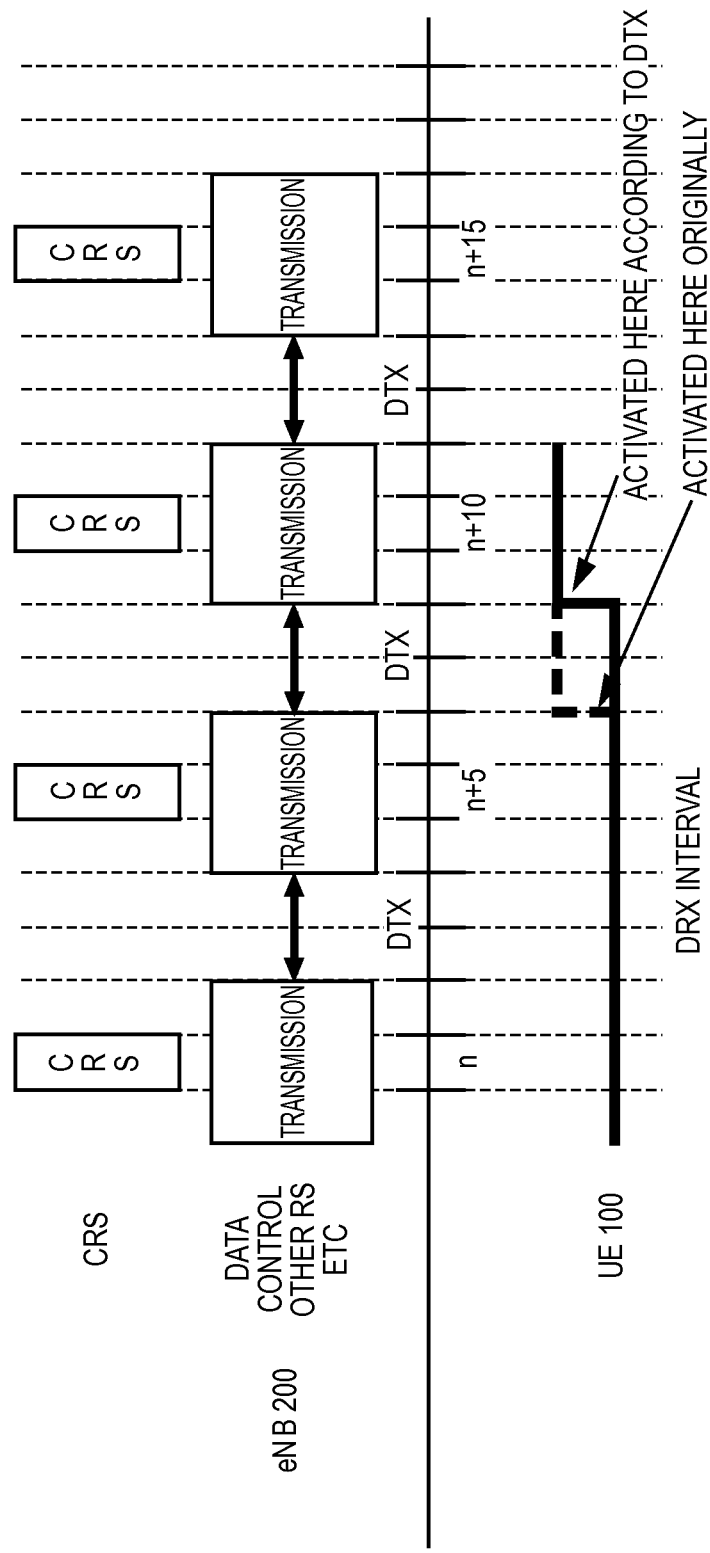
FIG. 11 is a diagram for illustrating an operation of a UE according to the second embodiment.

FIG. 11 is a diagram for illustrating an operation of the UE 100 according to the second embodiment. Here, a case in which the DTX interval is fixedly set in advance is described.

The processor 160 activates the receiver 112 at the activation timing according to the DRX cycle as illustrated in FIG. 11. Further, as described above in the first embodiment, the eNB 200 notifies the UE 100 of the DTX interval, and thus the processor 160 is aware of the DTX interval.

In the DTX interval, when the receiver 112 is activated, the receiver 112 is activated in vain. Thus, the processor 160 adjusts the activation timing to avoid the DTX interval. Specifically, when the activation timing according to the DRX cycle overlaps the DTX interval, the activation timing is advanced or transmitted so that the activation timing does not overlap the DTX interval. Here, an adjustment may be performed according to a type of DRX cycle, for example, such that the activation timing is delayed in the case of the long DRX cycle and advanced in the case of the short DRX cycle.

As described above, according to the second embodiment, it is possible to prevent the receiver 112 from being activated in vain and efficiently reduce the power consumption of the UE 100.

[Third Embodiment]

A third embodiment will be described focusing on a difference point with the first embodiment and the second embodiment. The third embodiment is an embodiment obtained by modifying the second embodiment partially.

Figure 12:
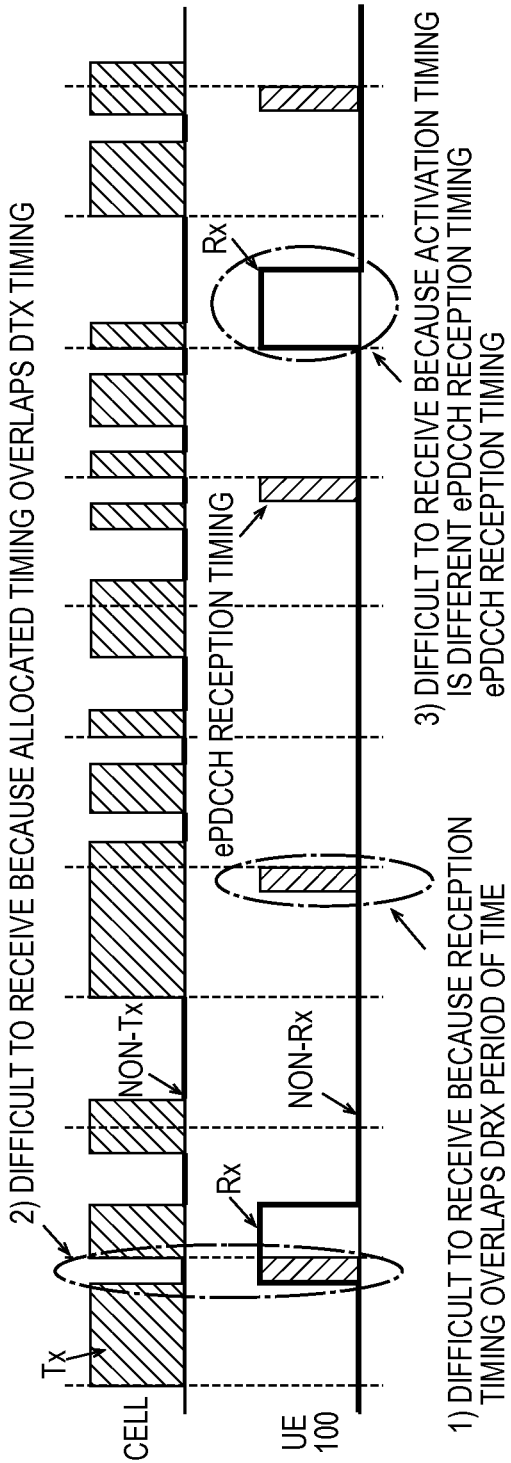
FIG. 12 is a diagram for illustrating an operation of a UE according to the third embodiment.
Figure 13:
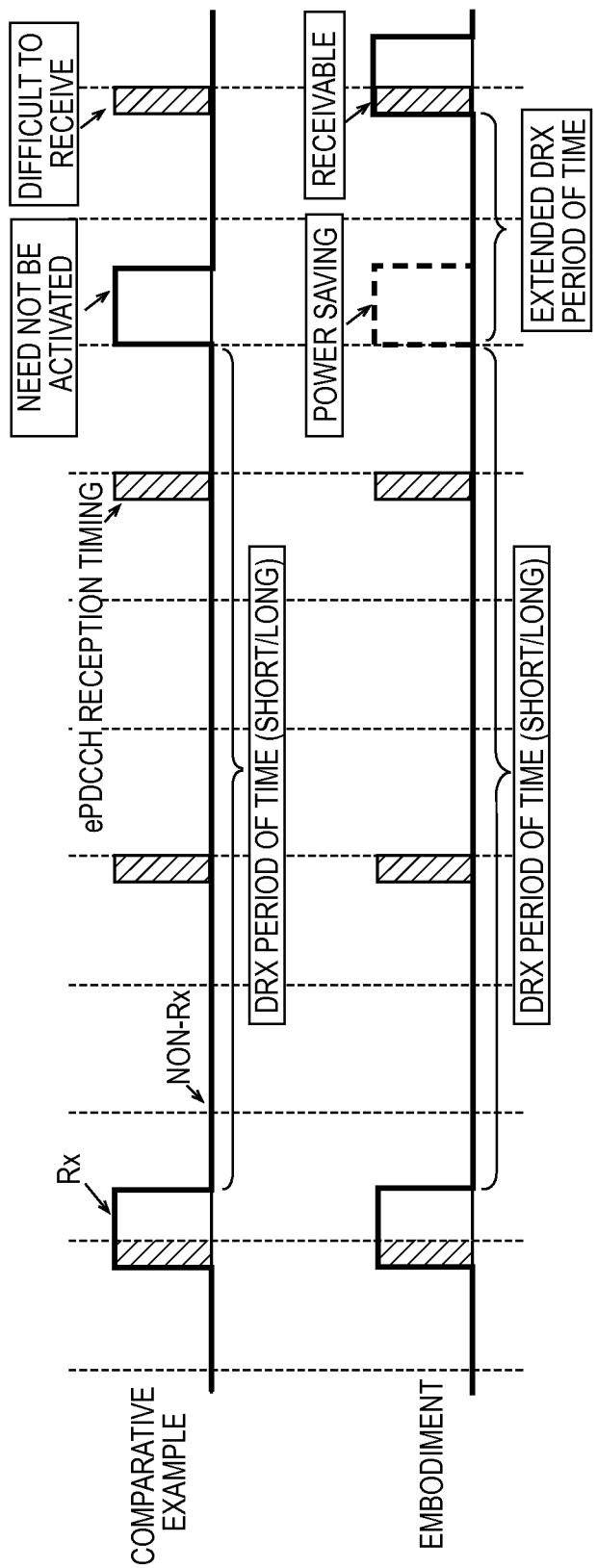
FIG. 13 is a diagram for illustrating an operation of a UE according to the third embodiment.

FIGS. 12 and 13 are diagrams for illustrating an operation of the UE 100 according to the third embodiment.

In the NCT, the ePDCCH is periodically allocated to the UE 100 as illustrated in FIG. 12. Here, when the receiver 112 of the UE 100 is in the stop state in the subframe to which the ePDCCH is set, the UE 100 can hardly receive the control signal. On the other hand, when the receiver 112 of the UE 100 is in the operation state in the subframe to which the ePDCCH is not set, it is in vain to monitor the control signal.

As described above, the processor 160 of the UE 100 activates the receiver 112 at the activation timing according to the DRX cycle. The eNB 200 notifies the UE 100 of the subframe (hereinafter, an "ePDCCH timing") to which the ePDCCH is set, and the processor 160 is aware of the ePDCCH timing.

The processor 160 adjusts the activation timing of the receiver 112 so that the receiver 112 enters the operation state at the ePDCCH timing as illustrated in FIG. 13. Thus, the receiver 112 can receive the control signal at the transmission timing of the control signal according to the ePDCCH. Specifically, when the activation timing according to the DRX cycle does not overlap the ePDCCH timing, the processor 160 causes the activation timing to overlap the ePDCCH timing by advancing or delaying the activation timing. Alternatively, the DRX cycle may be changed.

The activation timing may be adjusted according to a type of DRX cycle, for example, such that the activation timing is delayed in the case of the long DRX cycle and advanced in the case of the short DRX cycle. Alternatively, shortening (advancing) and extending (delaying) may be switched according to a remaining battery level or a QoS.

Further, when the eNB 200 fixedly sets the DTX interval (in the case of the second setting method), there are cases in which the DTX interval overlaps the ePDCCH timing. In this case, the processor 160 may adjust the activation timing until the ePDCCH timing that does not overlap the DTX interval.

As described above, according to the third embodiment, it is possible to prevent the receiver 112 from being activated in vain and efficiently reduce the power consumption of the UE 100.

[Other Embodiments]

The above-described embodiments have been mainly described in connection with the cases in which the present disclosure is applied to the LTE system, but the present disclosure is not limited to the LTE system and may be applied to a system other than the LTE system.

The entire contents of Japanese Patent Application No. 2013-080000 (filed on Apr. 5, 2013) are incorporated herein by reference.

INDUSTRIAL APPLICABILITY

The present disclosure is useful in a mobile communication field.

The invention claimed is:

1. A base station for managing a cell, comprising:
a controller including a processor configured to perform an on/off operation to turn a downlink transmission of the cell on and off, wherein
the processor performs:
a process of transmitting a periodic radio signal including a cell specific reference signal, and
a process of signaling, to a neighbor base station, information for a user terminal to identify a cycle of receiving the radio signal.

2. The base station according to claim 1, wherein
the controller notifies the user terminal of information for the user terminal to identify the cycle of receiving the radio signal.

3. The base station according to claim 2, wherein
the controller notifies the user terminal of the information using a radio resource control (RRC) message by a unicast.

4. The base station according to claim 1, wherein
the controller notifies the user terminal of information indicating a duration of transmitting the radio signal.

5. The base station according to claim 1, wherein the cycle has a time length of more than or equal to two subframes.

6. The base station according to claim 1, wherein the cell is a secondary component carrier in a carrier aggregation.

7. A base station for managing a cell, comprising: a controller including a processor configured to perform an on/off operation to turn a downlink transmission of the cell on and off, wherein
the processor performs:
a process of transmitting a periodic radio signal including a cell-specific reference signal, and
a process of notifying, to a neighbor base station, information for a user terminal to identify a duration of transmitting the radio signal.

* * * * *